United States Patent [19]

Seguela et al.

[11] Patent Number: 5,180,783
[45] Date of Patent: Jan. 19, 1993

[54] COMPOSITIONS CONTAINING ETHYLENE COPOLYMERS AND RESULTANT PRODUCTS

[75] Inventors: Brigitte Seguela, Hinges; Patrick Kaifasz, Lens, both of France

[73] Assignee: Atochem, France

[21] Appl. No.: 633,397

[22] Filed: Dec. 21, 1990

[30] Foreign Application Priority Data

Dec. 27, 1989 [FR] France .............. 89 172240

[51] Int. Cl.$^5$ .............. C08L 23/26; C08L 23/36
[52] U.S. Cl. .............. 525/198; 525/193; 525/194; 525/197; 525/207; 525/74
[58] Field of Search .............. 525/194, 207, 197, 198

[56] References Cited

U.S. PATENT DOCUMENTS

| | | | |
|---|---|---|---|
| 4,555,546 | 11/1985 | Patel | 525/227 |
| 4,678,834 | 7/1987 | Boivin et al. | 525/78 |
| 4,820,774 | 4/1989 | Takao et al. | 525/208 |
| 4,933,389 | 6/1990 | Hikasa et al. | 525/207 |
| 4,946,896 | 8/1990 | Mitsuno et al. | 525/207 |
| 4,990,566 | 2/1991 | Hert | 525/207 |
| 4,997,720 | 3/1991 | Bourbonais et al. | 525/108 |
| 5,037,888 | 8/1991 | Vanderbilt | 525/207 |
| 5,047,482 | 9/1991 | Schlag et al. | 525/193 |

FOREIGN PATENT DOCUMENTS 1026607 1/1989 Japan.

*Primary Examiner*—Carman J. Seccuro, Jr.

[57] ABSTRACT

Compositions containing at least 60% by weight of at least one copolymer (A) of ethylene and at least one alpha-olefin with 3 to 10 carbon atoms, and no more than 40% by weight of at least one copolymer (B) based on ethylene and at least one anhydride of an unsaturated dicarboxylic acid, characterized in that:

(i) copolymer (A) has a density between 0.850 and 0.890, (ii) copolymer (B) contains at least 80 mol-% of units derived from ethylene and at least 0.1 mol-% of units derived from the anhydride of an unsaturated dicarboxylic acid, and (iii) at least one of copolymers (A) and (B) is modified by means of an effective amount either of a free-radical initiator if the modification involves copolymer (A), or of at least one compound capable of reacting with the anhydride functions of copolymer (B).

The procedure for their preparation is comprised of creating a homogeneous mixture of copolymer (A), copolymer (B) of the initiator and/or compound capable of modifying copolymer (A) and copolymer (B), respectively, in a mixer at a temperature between about 150° and 290° C.

Industrial articles obtained by transformation of the aforementioned composition.

2 Claims, No Drawings

COMPOSITIONS CONTAINING ETHYLENE COPOLYMERS AND RESULTANT PRODUCTS

BACKGROUND OF THE INVENTION

The present invention pertains to compositions containing, on the one hand, copolymers of ethylene and alpha-olefin(s) and, on the other hand, copolymers of ethylene and polar comonomer(2) in which at least one of the copolymers is modified by means of a suitable chemical agent.

The copolymers of ethylene and at least one alpha-olefin have been known for many years and have undergone a noteworthy development such that the more recent the development, the lower is their density. They are generally known under the name of "low-density linear polyethylene" if their density is between circa 0.915 and 0.945, under the name of "very-low-density linear polyethylene" if their density is between circa 0.890 and circa 0.915, and under the name of "ultra-low-density linear polyethylene" if their density is between circa 0.850 and circa 0.890.

It is known that the density and the degree of crystallinity of the copolymer decrease as the alpha-olefin(s) content increases. This is accompanied for the copolymer by an increasingly pronounced elastomeric behavior with correlatively decreasing thermoplastic characteristics.

The copolymers of ethylene and at least one alpha-olefin that have a very low density or, to an even greater extent, those with an ultra-low density are therefore suitable for use in applications which had previously been reserved for completely amorphous elastomers such as the ethylene and propylene rubbers known under the name EPR and the ethylene, propylene and diene rubbers known under the name EPDM.

In the context of the research that resulted in the present invention, it was particularly envisioned to effect the transformation of very-low- or ultra-low-density copolymers of ethylene and at least one alpha-olefin into wear-intensive pieces (industrial articles with good resistance to abrasion) such as shoe soles, paving slabs, and pipes for transporting abrasive products. It was discovered that it was not possible for a copolymer of given density to simultaneously obtain good resistance to abrasion and good alternating bending performance. Thus, the very-low-density linear polyethylenes have good abrasion resistance but no alternating bending performance (they break after several hundred cycles). Most of the ultra-low-density linear polyethylenes have better alternating bending performance, although it is insufficient for certain applications, but poor resistance to abrasion.

Thus, the problem to be resolved by the present invention is the development of a modification of low-density or ultra-low-density copolymers of ethylene and alpha-olefin(s) which makes it possible to obtain industrial articles that simultaneously have good resistance to abrasion and good alternating bending performance (preferably at least 100,000 bendings). This problem is resolved by the present invention which will now be presented in detail.

SUMMARY OF THE INVENTION

A first object of the present invention is comprised of compositions containing at least 60% by weight of a copolymer(A) of ethylene and at least one alpha-olefin with 3 to 10 carbon atoms, and no more than 40% by weight of at least one copolymer (B) based on ethylene and at least one anhydride of an unsaturated dicarboxylic acid, characterized in that:

(i) copolymer (A) has a density between 0.850 and 0.890, (ii) copolymer (B) contains at least 80 mol-% of units derived from ethylene and at least 0.1 mol-% of units derived from anhydride of an unsaturated dicarboxylic acid, and (iii) at least one of the copolymers (A) and (B) is modified by means of an effective amount of either at least one free radical initiator if the modification involves copolymer (A) or at least one compound that can react with the anhydride functions of copolymer (B).

The invention also comprises industrial products made from such compositions having good abrasion resistance and bending (flexing) performance as hereinafter described.

DETAILED DESCRIPTION

In accordance with the present invention, "copolymer (A)" is understood to mean:

(a) a polyolefinic rubber marketed by MONTEDISON under the name DUTRAL®, comprised of a copolymer of from 65 to 80 mol-% of ethylene and from 20 to 35 mol-% of propylene, which has a density of 0.850 to 0.870, does not have any residual crystallinity and thus no crystalline melting point, has a geometric mean molecular weight from 90 to 100 kg/mole and a polydispersity index between 2.2 and 2.9;

(b) a polyolefinic rubber marketed by MITSUI under the name TAFMER®, comprised of a copolymer of from 78 to 92 mol-% of ethylene and from 8 to 22 mol-% of an alpha-olefin selected from among propylene and 1-butene, which has a density between 0.860 and 0.890, a residual crystallinity between 1 and 14%, a crystalline J melting point of 75° C., a geometric mean molecular weight between 60 and 120 kg/mole and a polydispersity index between 2.2 and 2.7; and (c) a polyolefinic rubber compound of an ethylene/propylene and/or 1-butene copolymer, which has a fluidity index between circa 0.3 and 15 dg/minute and a density between circa 0.865 and 0.885, containing between 77 and 91 mol-% of units derived from ethylene and between 9 and 23 mol-% of units derived from the propylene and/or the 1-butene, characterized by a crystalline J melting point between circa 100° and 125° C.

This rubber may be secondarily characterized by at least one of the following elements:

(i) a polydispersity index between circa 3.5 and 15, preferably between circa 4 and 8, (ii) a geometric mean molecular weight (as defined below) between circa 35 and 70 kg/mole, (iii) a relationship between the density d and the content x (expressed in mol-%) of units derived from the propylene and 1-butene which is expressed by the double equation:

$$0.9084 \leq d + 0.002 \times 0.918, \text{ and}$$

(iv) residual crystallinity (determined according to the method described below) between circa 3 and 15%.

In accordance with the present invention, "crystalline J melting point" is understood to mean the temperature determined at the maximum of the melting curve after crystallization obtained by subjecting the copolymer sample to the following three-step process:
(i) melting at the rate of 8° C. per minute from 10° C. to 150° C., then
(ii) crystallization at the rate of 8° C. per minute from 150° C. to 10° C., and then again
(iii) melting at the rate of 8° C. from 10° C. to 150° C.

In accordance with the present invention, the residual crystallinity is determined by x-ray diffraction of a copolymer sample that has undergone cooling at the rate of 5° C. per hour from 190° C. to room temperature.

In accordance with the present invention, the "geometric mean molecule weight" is defined by the following mathematical relationship:

$$\log_{10} Mg = \sum_{i=1}^{i=N} W_i \log_{10} M_i$$

in which $W_i$ is the fraction by weight of material $M_i$ and N is the number of fractions eluted by permeable gel chromatography.

Such copolymers can be obtained notably by copolymerizing, at a temperature of circa 160° to 270° C. and under a pressure of circa 400 to 850 bar, a gas stream comprising from circa 18 to 42% by volume of ethylene and from circa 58 to 82% by volume of (propylene+1-butene) olefins in the presence of a catalytic system of the Ziegler type containing an organo-aluminum activator and a compound of a transition metal from Groups IVB, VB, VIB or VIII of the Periodic Table.

For implementation of the invention, copolymers (A) are preferably in powder or pellets or granule form.

Copolymer (B) can be an ungrafted copolymer of ethylene and at least one anhydride of an unsaturated dicarboxylic acid, obtained by copolymerization of the monomers at a temperature between 180° and 300° C., under a pressure between 1000 and 3000 bar, in the presence of a free-radical initiator and, if required, a transfer agent such as 1-butene. In this case, it generally contains 97 to 99.7 mol-% of units derived from ethylene and from 0.3 to 3 mol-% of units derived from the anyhydride of an unsaturated dicarboxylic acid.

Advantageously, copolymer (B) is a terpolymer (B1) containing:
(i) from circa 83 to 98.7 mol-% of units derived from ethylene,
(ii) from circa 1 to 14 mol-% of units derived from at least one ester of acrylic and/or methacrylic acid, and
(iii) from circa 0.3 to 3 mol-% of units derived from at least one anhydride of an unsaturated dicarboxylic acid.

The anhydride of an unsaturated dicarboxylic acid can be maleic anhydride, citraconic anhydride, itaconic anhydride or tetrahydrophthalic anhydride. It is advantageous to use maleic anhydride.

The fluidity index of copolymer (B), measured according to the standard ASTM D 1238 condition E, is advantageously between 1 and 10 dg/minute.

Terpolymer (B1) can be obtained, for example, under the conditions described in French patents Number 2,498,609; 2,569,411 and 2,569,412 whose disclosure is incorporated herein by reference. The ester of acrylic or methacrylic acid preferably has an alkyl group with 1 to 8 carbon atoms. As examples can be cited the methyl, ethyl, n-propyl, isopropyl, n-butyl, iso-butyl, n-pentyl, n-hexyl, ethyl-2-hexyl, n-octyl and cyclohexyl acrylates and methacrylates.

In accordance with the invention, copolymer (B) is also understood to mean a mixture of from circa 1 to 99% by weight of at least one copolymer containing:
(i) from circa 83 to 99.7 mol-% of units derived from ethylene,
(ii) from circa 0 to 14 mol-% of units derived from at least one ester of acrylic or methacrylic acid, and
(iii) from circa 0.3 to 3 mol-% of units derived from an anhydride of an unsaturated dicarboxylic acid, and correspondingly, from circa 99 to 1% by weight of at least one copolymer (B2) containing:
(i) from circa 80 to 99 mol-% of units derived from at ethylene, and
(ii) from circa 1 to 20 mol-% of units derived from at least one $C_1$ to $C_6$ alkyl acrylate or methacrylate.

Copolymers (B2) can be obtained by radical copolymerization of a mixture of ethylene and at least one ester of acrylic and/or methacrylic acid, for example an alkyl (meth) acrylate, the alkyl radical of which has from 1 to 8 carbon atoms, for example, in accordance with one of the procedures described in French patents 2,569,411 and 2,569,412.

It is also possible to employ as copolymer (B) a polymer such as described in the French patent Number 2,621,920, with a fluidity index advantageously between circa 1 and 2 dg/minute, and containing:
(i) from 83 to 99.7 mol-% of units derived from ethylene,
(ii) from 0 to 13.6 mol-% of units derived from at least one $C_1$ to $C_{12}$ alkyl acrylate or methacrylate,
(iii) from 0.29 to 3 mol-% of units derived from at least one anhydride of an unsaturated dicarboxylic acid, and
(iv) from 0.01 to 0.4 mol-% of units derived from at least one polyol poly(meth)acrylate (product of the at least partial esterification of a polyol by acrylic or methacrylic acid).

This latter polymer can be combined with a copolymer of ethylene and an anhydride of an unsaturated dicarboxylic acid and/or with a terpolymer (B1) and/or with a copolymer (B2) as they are defined above.

Copolymer (B) can also be a grafted copolymer containing at least 80% by weight of units derived from ethylene and no more than 20% by weight of units derived from the anhydride of an unsaturated dicarboxylic acid, obtained by reduction of the said anhydride with a homopolymer of ethylene in the presence of a free-radical initiator.

The free-radical initiator capable of modifying copolymer (A) is selected from among the known peroxides, hydroperoxides, peresters and azo derivatives. The peroxides with an alkyl-aromatic structure can be cited more specifically.

An "effective amount of free-radical initiator" is understood to mean an amount of at least 0.01 millimole per kg of copolymer (A), preferably an amount between 0.2 and 0.8% by weight in relation to copolymer (A). Excessively large amounts should be avoided since there is the risk that they would result in total cross-linking or fragmentation of copolymer (A).

The compound which is capable of reacting with the anhydride functions of copolymer (B) is preferably selected from among the compounds that have at least one primary amine function or at least two secondary amine functions, or a least two alcohol functions, or at least one primary or secondary amine function and at least one primary alcohol function. As examples can be cited the alcohol-amines such as diethanolamine, the primary diamines such as 4,4'-methylenedianiline and the secondary diamines such as diorthotolylguanidine. It is also possible to employ compounds that have at least one epoxide function per molecule, preferably at least two epoxide functions per molecule, such as bisphenol A diglycidylether and the copolymers of ethylene and gylcidyl (meth)acrylate, in the presence, if required, of an accelerator such as a tertiary amine. Modification of copolymer (B) is understood to mean an at least partial cross-linking and the compound capable of reacting with the anhydride functions of copolymer (B) is referred to below as "cross-linking agent."

"Effective amount of cross-linking agent" is understood to mean an amount capable of effecting a number of bridgings which is sufficient for an improvement in the targeted properties of the composition in accordance with the invention. This amount is advantageously such that the molar ratio of the reactive functions of the cross-linking agent to the anhydride functions or copolymer (B) is between 0.5 and 2, preferably between 0.8 and 1.2.

The compositions in accordance with the invention can also contain effective amounts of additives such as stabilizers, unmolding (release) agents, lubricants, plasticizers, pigments and mineral fillers, in amounts advantageously between 0.1 and 5% by weight in relation to the composition.

A second object of the invention is a procedure for the preparation of the compositions described above, characterized in that it comprises the creation of a homogeneous mixture of copolymer (A); copolymer (B) and the initiator and/or the compound capable of modifying copolymer (A) and copolymer (B), respectively, in a mixer at a temperature between circa 150° and 290° C. The composition obtained can then be extruded and transformed into granules which are subsequently transformed into industrial articles.

In accordance with a specific mode of implementation pertaining to the modification of copolymer (B), the procedure in accordance with the invention is comprised by successively:

(a) creating a homogeneous mixture, at a temperature between room temperature and 150° C., or copolymer (B2) and the cross-linking agent,
(b) adding copolymer (B) to the mixture obtained, at a temperature between room temperature and 150° C.,
(c) adding copolymer (A) to the mixture obtained, at a temperature between circa 150° and 290° C.

Advantageously, the mixture obtained after step (a) is extruded and transformed into granules. In addition, copolymer (B) and copolymer (A) are also employed in granule form. In this case, steps (b) and (c) are only comprised of one step which consists of first creating at room temperature a homogeneous mixture of the granules of the three products and then introducing this mixture into a mixer, melting it at a temperature between 150° and 290° C. and then transforming it into finished objects or ready-to-use granules.

In accordance with another variant, pertaining specifically to the modification of copolymer (A), the procedure is comprised of a first step which involves bringing to a temperature between 100° and 230° C. for a period of time between 3 and 10 minutes, a mixture of copolymer (A) and the free-radical initiator and then introducing into this mixture a copolymer (B) accompanied, if required, by the effective amount of the compound capable of modifying it, and of mixing everything at a temperature between 150° and 290° C. for a period of time between 3 and 10 minutes.

It is advantageous to operate with a dual-feed calender or extruder into which are introduced the mixtures prepared in the dry state, the granules of copolymer (A) and the free-radical initiator, on the one hand, and when the mixture has reached a temperature of at least 150° C., a dry mixture of copolymer (B) and the cross-linking agent, on the other hand.

The possible additives mentioned above are advantageously introduced during the preparation of the dry mixtures.

After calendering or mixing in an internal mixer or extruder, the compositions obtained are transformed into industrial articles by any known technique such as press molding or injection or they are transformed into ready-to-use granules.

The industrial articles obtained can be films, sheets, profiles, tubes or pipes that have, compared to copolymer (A), a clearly improved abrasion resistance and alternating bending performance.

The invention will be further described in connection with the following examples which are set forth for purposes of illustration only.

The following copolymers and reagents were employed. The standard fluidity indices of the copolymers were measured according to standard ASTM D 1238 condition E.

The following was employed:
A. as copolymer (A)
  1. a terpolymer of ethylene, propylene and 1-butene (referred to below as A1) with a density of 0.870, a standard fluidity index of 1.8 dg/minute, a content of units derived, respectively from ethylene: 78 mol-%, from propylene: 12 mol-%, from 1-butene: 10 mol-%, a crystalline J melting point equal to 109° C., a residual crystallinity of 5% and a polydispersity index Mw/Mn equal to 4.5; and
  2. a terpolymer of ethylene, propylene and 1-butene (referred to below as A2) having the same characteristics as terpolymer A1 mentioned above with the exception of the fluidity index which is equal to 4 dg/minute and the polydispersity index which is equal to 4.8;
B. as copolymer (B), a terpolymer (B1) of ethylene, ethyl acrylate (30% by weight) and maleic anhydride (2% by weight) having a standard index of fluidity equal to 4 dg/minute;
C. as copolymer (B2); a copolymer of ethylene (72% by weight) and n-butyl acrylate (28% by weight) having a standard fluidity index equal to 5 dg/minute;
D. as the modifier of copolymer (A): the peroxide marketed under the name PERKADOX® Y 14/96 (referred to below as P);
E. as the cross-linking agent of copolymer (B), diethanolamine (referred to below as DEA).

Unless otherwise indicated, all the amounts are expressed in parts by weight.

The compositions are transformed into sheets by press molding at 190° C. for 1 minute under a pressure of 1 bar, then for 4 minutes under a pressure of 250 bars and then under cold press (20° C., 100 bar, 4 minutes). The 4-mm-thick sheets obtained are subjected to the following tests:
(i) resistance to abrasion (R.A.) according to standard NFG62001, expressed in mm3 (the lower the value obtained, the better the result), and (ii) resistance to alternating flexing (flexing strength) DE MATTIA (R.F.) according to standard NFG46016, measured at 20° C. and expressed as the number of flexings at the end of which there appears a 16-mm crack, when the number of flexings is lower than 100,000.

EXAMPLES 1 AND 2 (COMPARATIVE)

The compositions contain solely copolymer (A) (copolymers A1 and A2, respectively) and are transformed into sheets according to the process described above. The results of the measurements carried out are shown in Table I below.

EXAMPLE 3

Employing the amounts shown in the table below, one prepares a dry mixture of copolymer A2 and peroxide P, on the one hand, and a dry mixture of copolymer B1 and copolymer B2, on the other hand. Using a calender at a temperature of 200° C., one introduces first the first mixture for 4 minutes and then the second mixture for 4 minutes. The composition discharged from the calender is then transformed into sheets according to the process described above. The results of the measurements carried out are shown in Table I below.

EXAMPLES 4 AND 5

A master mixture (referred to below as MM1) containing 96% by weight of copolymer B2 and 4% by weight of diethanolamine was first created by mixing these two constituents in an internal mixer for 3 minutes at 80° C.

On the basis of master mixture MM1, the master mixture MM2 was prepared by drum mixing 16.7% by weight of master mixture MM1 and 83.3% of terpolymer B1.

The compositions were then prepared by drum homogenization for 20 minutes of granules of copolymer (A) (A1 and A2, respectively) and master mixture MM2. The homogeneous granules were then extruded on a TROESTER B60 single-screw extruder at 210° C. at a screw speed of 30 rpm and the compositions obtained were transformed into sheets according to the process described above. The results of the measurements carried out are shown in Table I below.

EXAMPLES 6 AND 7

In accordance with these examples, the compositions show successively the modification of the type (A) copolymer by peroxide P and the modification of terpolymer B1 by diethanolamine. They are obtained by passing through a calender a dry mixture of copolymer A and peroxide P at 200° C. for 4 minutes followed by passage through the same calender of a mixture of terpolymer B1 and the master mixture MM2 for 4 minutes at 200° C. The compositions were then transformed into sheets as described above. The results of the measurements carried out are shown in Table I below.

TABLE I

| Example | Constituents of the composition in % by weight | | | | | | R.A. | R.F |
|---|---|---|---|---|---|---|---|---|
| | A1 | A2 | B1 | B2 | P | DEA | | |
| 1 | 100 | — | — | — | — | — | 161 | $10^4$ |
| 2 | — | 100 | — | — | — | — | 618 | $3.2 \times 10^4$ |
| 3 | — | 75.5 | 20 | 4 | 0.5 | — | 301 | $>10^5$ |
| 4 | 76 | — | 20 | 3.84 | — | 0.16 | 118 | $>10^5$ |
| 5 | — | 76 | 20 | 3.84 | — | 0.16 | 213 | $>10^5$ |
| 6 | 75.5 | — | 20 | 3.84 | 0.5 | 0.16 | 95 | $>10^5$ |
| 7 | — | 75.5 | 20 | 3.84 | 0.5 | 0.16 | 126 | $>10^5$ |

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. The process for the preparation of a composition consisting essentially of at least 60% by weight of at least one copolymer (A) of ethylene and at least one alpha olefin with 3 to 10 carbon atoms and a positive amount up to 40% by weight of a copolymer (B) based on ethylene and at least one anhydride of an unsaturated dicarboxylic acid, said copolymer (A) having a density between 0.850 and 0.890, a residual crystallinity between about 3 and 15%, and a crystalline J melting point between 100° and 125° C., and said copolymer (B) containing at least 80 mol-% of units derived from ethylene and at least 0.1 mol-% of units derived from the anhydride of the unsaturated dicarboxylic acid, comprising:

(a) creating a homogeneous mixture, at a temperature between room temperature and 150° C., of copolymer (B2) and a compound capable of modifying copolymer (B), (b) adding copolymer (B) to the mixture obtained, at a temperature between room temperature and 150° C., and (c) adding copolymer (A) to the mixture obtained, at a temperature between about 150° C. and 290° C.;

said copolymer (B2) containing:

(a) from 80–99 mol-% of units derived from ethylene, and (b) from 1 to 20 mol-% of units derived form at least one ester of a $C_1$ to $C_6$ alkyl acrylate to metacrylate.

2. The process for the preparation of a composition consisting essentially of at least 60% by weight of at least one copolymer (A) of ethylene and at least one alpha olefin with 3 to 10 carbon atoms and a positive amount up to 40% by weight of a copolymer (B) based on ethylene and at least one anhydride of an unsaturated dicarboxylic acid, said copolymer (A) having a density between 0.850 and 0.890, a residual crystallinity between about 3 and 15%, and a crystalline J melting point between 100° and 125° C., and said copolymer (B) containing at least 80 mol-% of units derived from ethylene and at least 0.1 mol-% of units derived form the anhydride of the unsaturated dicarboxylic acid, comprising a first step of bringing to a temperature between about 100° and 230° C. for a period of time between 3 and 10 minutes, a mixture of copolymer (A) and free-radical initiator, and then of introducing into tis mixture a copolymer (B), accompanied, if present, by an effective amount of the compound capable of modifying it, and of mixing of all this at a temperature between about 150° and 290° C. for a period of time between 3 and 10 minutes.

* * * * *